(12) United States Patent
Lush

(10) Patent No.: US 7,131,395 B1
(45) Date of Patent: Nov. 7, 2006

(54) COLLAPSIBLE MESH FEEDER

(76) Inventor: Raymon W. Lush, 410 Main St., Bloomfield, NE (US) 68718

( * ) Notice: Subject to any disclaimer, the term of this patent is extended or adjusted under 35 U.S.C. 154(b) by 20 days.

(21) Appl. No.: 11/029,534

(22) Filed: Jan. 4, 2005

(51) Int. Cl.
*A01K 5/00* (2006.01)
(52) U.S. Cl. ................................................ 119/57.8
(58) Field of Classification Search ............... 119/57.8, 119/52.2, 52.1, 54
See application file for complete search history.

(56) References Cited

U.S. PATENT DOCUMENTS

| 3,399,650 | A |   | 9/1968  | Goodman       | 119/51    |
|-----------|---|---|---------|---------------|-----------|
| 4,026,244 | A | * | 5/1977  | Salick        | 119/57.8  |
| 4,706,851 | A |   | 11/1987 | Hegedus et al.| 222/106   |
| 5,203,281 | A |   | 4/1993  | Harwich       | 119/57.9  |
| 5,479,881 | A |   | 1/1996  | Lush et al.   | 119/57.8  |
| 5,740,758 | A | * | 4/1998  | Damm          | 119/57.8  |
| 5,970,913 | A | * | 10/1999 | Bloedorn      | 119/57.8  |
| 6,047,661 | A |   | 4/2000  | Lush          | 119/51.01 |
| 6,067,934 | A |   | 5/2000  | Harwich       | 119/57.8  |
| 6,073,582 | A | * | 6/2000  | Lush          | 119/51.01 |
| 6,427,629 | B1|   | 8/2002  | Lush          | 119/52.1  |
| 6,532,896 | B1|   | 3/2003  | Hurlbert      | 119/57.8  |

FOREIGN PATENT DOCUMENTS

HU                63983 T    *  11/1993

\* cited by examiner

*Primary Examiner*—Teri Pham Luu
*Assistant Examiner*—Elizabeth Shaw
(74) *Attorney, Agent, or Firm*—Thomte, Mazour & Niebergall; Dennis L. Thomte

(57) ABSTRACT

A collapsible feeder for birds comprising a mesh feeder body wall which is constructed of either a polyester mesh coated with PVC or a material containing rubber. The mesh wall defines alternating first and second rows with each of the rows having spaced-apart wall members which are separated by an opening. The first and second rows are staggered with respect to one another so that the openings in one row are positioned below or above the wall members in adjacent rows to define feed openings. Preferably, the feeder body is generally tubular-shaped but may have other shapes such as frusto-conical or inverted frusto-conical shapes.

3 Claims, 4 Drawing Sheets

COLLAPSIBLE MESH FEEDER

BACKGROUND OF THE INVENTION

1. Field of the Invention

This invention relates to a collapsible feeder and more particularly to a collapsible feeder for birds, squirrels and the like which is convenient to install, convenient for wild game to perch upon, and which includes a mesh feeder body comprised of a flexible plastic or rubbery material.

2. Description of the Related Art

Selectively collapsible containers are commonly used to hold seeds, suet and the like as food for wild animals such as birds, squirrels, etc. Many of the collapsible wild game feeders of the prior art are constructed from plastic polymer, natural fiber mesh or netting. Mesh or netting feeders have the advantage of not requiring a rod, dowel or other support for small birds, since the birds can perch on the mesh or net and feed at any exposed location on the feeder. Examples of mesh or net feeders of the prior art including the Thistle Pouch brand feeder manufactured by Havegard Farm, Inc. of Algoma, Wis., and Feathered Friends E-Z Feeders brand wild bird feeder marketed by Canine's Choice of Marion, Ind. Other types of collapsible feeders are disclosed in U.S. Pat. Nos. 5,203,281; 4,706,871; and 4,026,025. Another type of collapsible wild game feeder is described in applicant's U.S. Pat. No. 5,479,881. The feeder of the '881 patent consists of a solid, weather-resistant bag fitted with openings at its base to allow attachment of rods for perching and access to the seed or other food contained in the bag.

Wire mesh feeders constructed of rigid steel wire are also well-known to those skilled in the art of wild game feeding. The rigid steel wire mesh feeders are frequently used to hold blocks of suet or mixtures of seed, animal fat, peanut butter and the like. Although the rigid wire mesh feeders of the known art are resistant to chewing by squirrels and pecking by aggressive feeding birds, the rigid wire mesh feeders are not selectively collapsible for storage, shipment, etc. When the rigid wire mesh feeders are bent, dented, flattened or crushed, they cannot be expanded and reused without suffering metal fatigue and damage to their attachments, connections and welds. One further disadvantage of many collapsible feeders is that they are suited for only one size of feed.

In an effort to overcome the disadvantages of the prior art collapsible feeders, applicant previously designed collapsible feeders which are disclosed in U.S. Pat. Nos. 6,047,661; 6,073,582; and 6,427,629. In the '661 and '582 patents, the mesh openings were designed to accommodate a specific seed size. In the '629 patent, applicant's feeder body is comprised of a plurality of annular ring members. In the feeder of the '629 patent, the feeder body remains in its extended position through frictional engagement between the hollow body segments. Occasionally, the hollow body segments, even though in frictional engagement with one another, tend to collapse during the filing procedure unless the feeder is hanging from a support. The feeders of applicant's earlier patents truly represented a significant advance in the art and it is believed that the collapsible feeder described herein represents an improvement over applicant's earlier designs.

SUMMARY OF THE INVENTION

A collapsible feeder for birds, squirrels and the like is disclosed and includes a collapsible feeder body having upper and lower ends. A horizontally disposed support defining a feed fill opening is secured to the upper end of the feeder body which defines a feed fill opening therein. A cover member selectively closes the feed fill opening. The lower end of the feeder body is closed by a lower base or wall. The feeder body is comprised of a collapsible, generally tubular-shaped, non-metallic mesh wall. The mesh wall is comprised of a plurality of alternating, generally horizontally disposed first and second rows which are joined together. Each of the first rows comprises a plurality of horizontally spaced-apart wall members having an opening positioned therebetween. Each of the second rows comprises a plurality of horizontally spaced-apart wall members having an opening positioned therebetween. The first and second rows are horizontally staggered with respect to one another so that the openings in the first rows are positioned above or below the wall members in the second rows and so that the openings in the second rows are positioned above or below the wall members in the first rows. In one embodiment, the mesh wall comprises a polyester mesh coated with PVC. In another embodiment, the mesh wall is comprised of a material containing rubber. Preferably, the wall members and the openings are generally square-shaped. The first and second rows are joined together by means of the corners of the wall members in the first rows being secured to corners of the wall members in the second rows.

It is therefore a principal object of the invention to provide a selectively collapsible feeder for birds, squirrels and other wild game.

Yet another object of the invention is to provide a selectively collapsible feeder which is comprised of a polyester mesh coated with PVC or a mesh material containing rubber.

Still another object of the invention is to provide a collapsible feeder including a mesh feeder body comprised of a plurality of horizontally spaced wall members and openings which are arranged in alternating rows so that the openings in one row are positioned above or below the wall members in an adjacent row.

Still another object of the invention is to provide a selectively collapsible feeder which occupies a minimum of space for shipping and storage when empty.

These and other objects will be obvious to those skilled in the art.

DESCRIPTION OF THE PREFERRED EMBODIMENT

Figure 1:
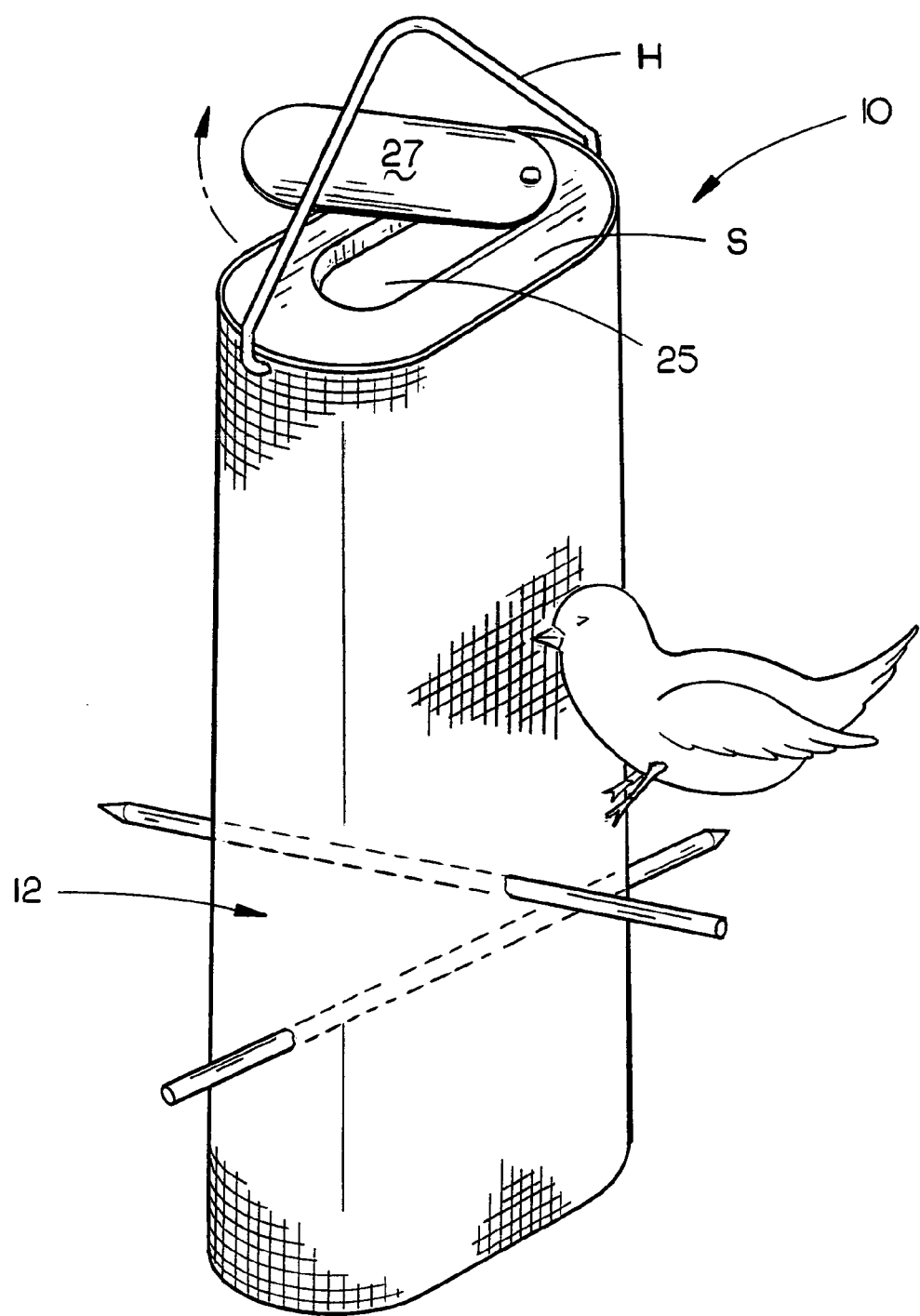
FIG. 1 is a perspective view of the bird feeder of this invention in its extended position.
Figure 2:
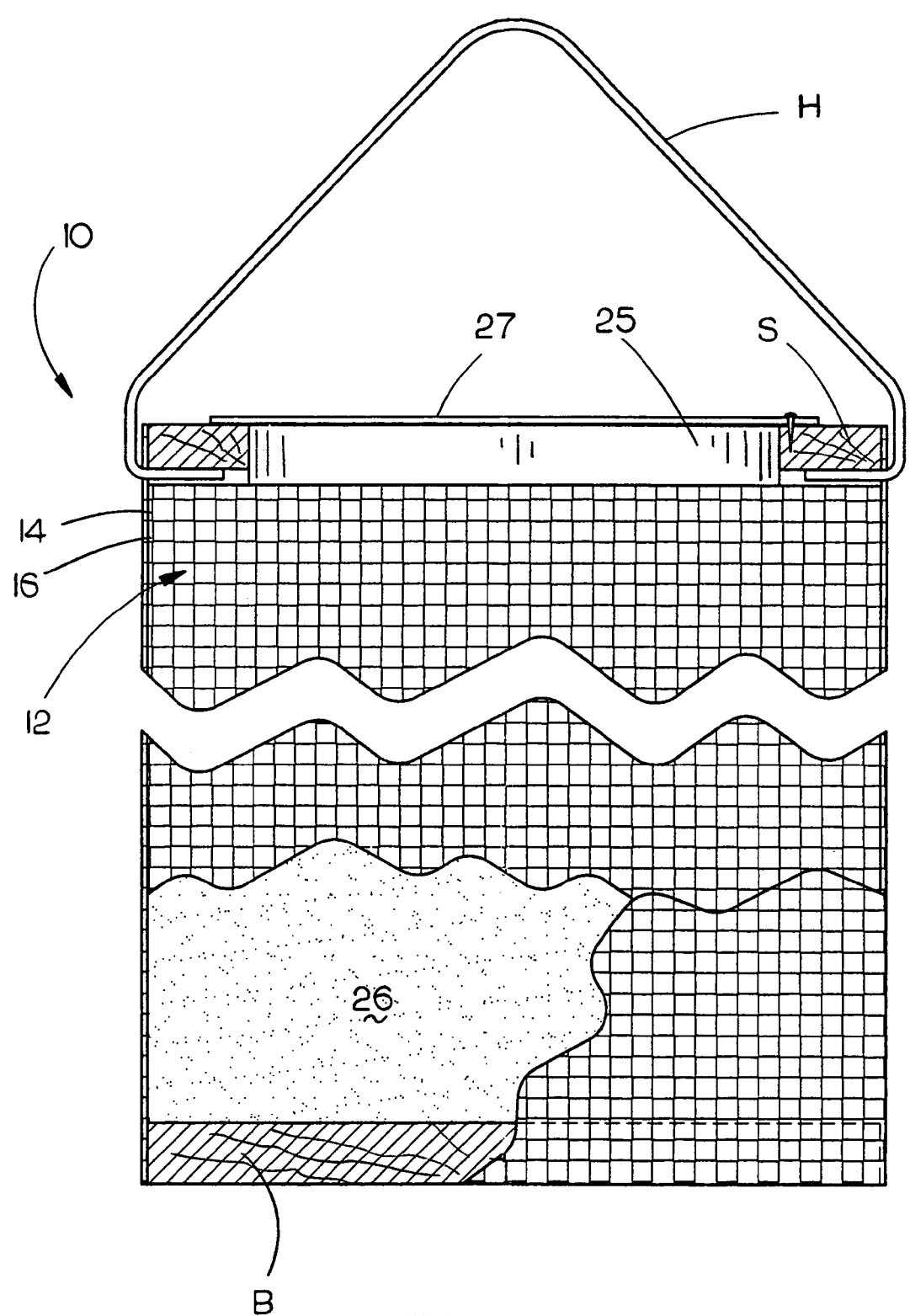
FIG. 2 is a partial side view of the feeder with portions thereof cut away to more fully illustrate the invention.
Figure 3:
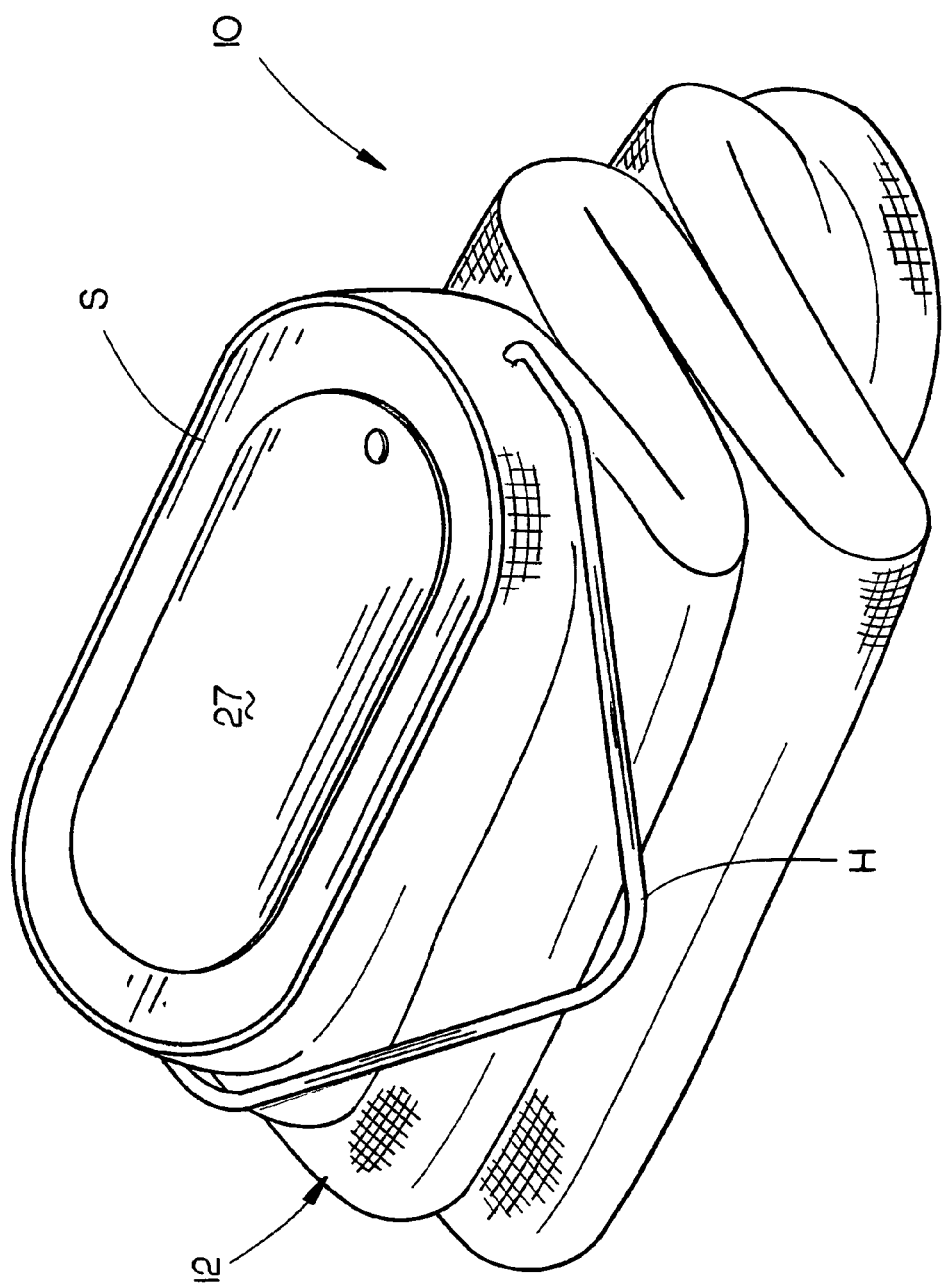
FIG. 3 is a perspective view of the feeder in its collapsed position.
Figure 4:
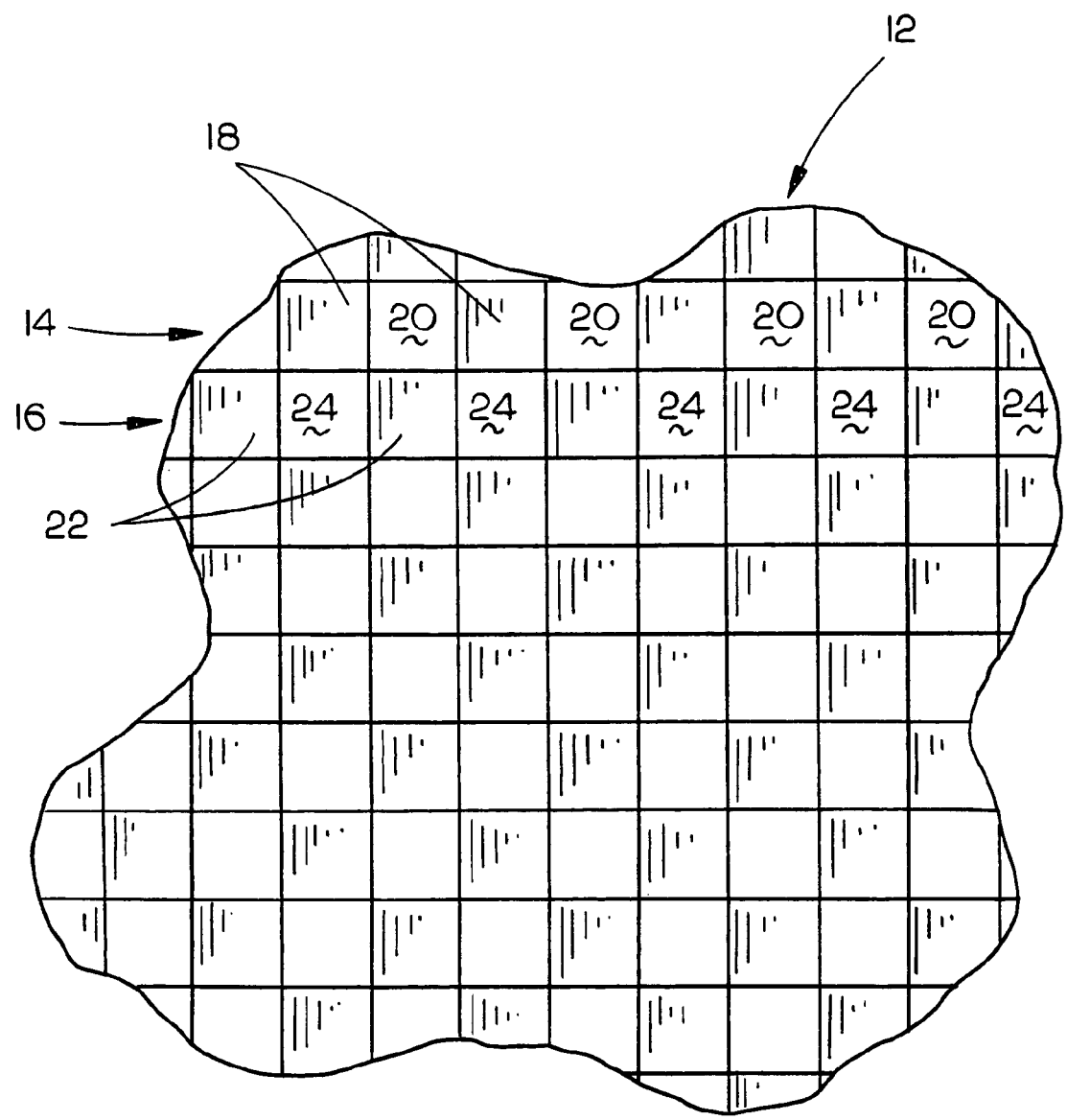
FIG. 4 is a partial side view of the feeder illustrating the design of the mesh wall.

The collapsible feeder of this invention is referred to generally by the reference numeral 10. Feeder body 10 includes a feeder body 12 comprised of a mesh material having upper and lower ends. In one embodiment, the mesh wall feeder body 12 is comprised of a polyester mesh coated with PVC. In another embodiment, the mesh wall is comprised of a material containing rubber. Regardless of whether the mesh wall is comprised of a polyester mesh coated with PVC or a material containing rubber, the feeder body 12 includes a plurality of alternating first and second rows 14 and 16. Row 14 is comprised of a plurality of generally square-shaped or quadrilaterally-shaped wall members 18 separated by openings 20. Row 16 is comprised of a plurality of horizontally spaced-apart wall members 22 having an opening 24 positioned therebetween. As seen in FIG. 4, the rows 14 and 16 are horizontally staggered or offset with respect to one another so that the wall members 22 in rows 16 are positioned above or below the openings 20 in rows 14 and so that the wall members 18 in rows 14 are positioned above or below the openings 24 in rows 16. As seen in FIG. 4, the corners of the wall members 18 are joined to the corners of wall members 22 in adjacent rows. A support S is provided at the upper end of the feeder to which the body 12 is attached. Support S includes a feed fill opening 25 which is selectively closed by a lid or cover 27. Hanger H is preferably secured to support S, as seen in FIG. 2. The lower end of the feeder body is closed by a base or wall B. The feeder body 12 is collapsible so that the feeder may be collapsed for shipment and storage, as seen in FIG. 3.

The openings 20 and 24 define feed openings which are small enough to prevent the bird feed in the feeder body from freely passing therethrough but which are large enough so that birds may feed therethrough. It is preferred that at least a pair of elongated perch rods 26 and 28 be inserted through the feeder body at spaced-apart locations to provide a convenient means for the birds to perch upon.

The feeder of this invention is ideally suited for use with small bird seed such as Niger. The flexible material of the mesh feeder body enables the birds to easily grasp the same to cling to the feeder wall so that they may gain access to the feed within the feeder body.

It can therefore be seen that a novel bird feeder has been provided which may be collapsed for packaging, storage or shipment, but which may be extended for use.

Thus it can be seen that the invention accomplishes at least all of its stated objectives.

I claim:

1. A collapsible feeder for birds, comprising:
   a horizontally disposed support defining a feed fill opening therein;
   a cover member selectively closing said feed fill opening;
   a collapsible, generally tubular-shaped, non-metallic mesh wall, having upper and lower ends;
   said upper end of said mesh wall being secured to said support and extending downwardly therefrom;
   a lower base secured to said mesh wall which extends across the lower end thereof;
   said mesh wall being comprised of a plurality of alternating, generally horizontally disposed, first and second rows joined together;
   each of said first rows comprising a plurality of horizontally spaced-apart wall members having an opening positioned therebetween;
   each of said second rows comprising a plurality of horizontally spaced-apart wall members having an opening positioned therebetween;
   said first and second rows being horizontally staggered with respect to one another so that the said openings in said first rows are positioned above or below the said wall members in said second rows and so that the said openings in said second rows are positioned above or below the said wall members in said first rows;
   said mesh wall comprising a polyester mesh coated with polyvinyl chloride (PVC).

2. A collapsible feeder for birds, comprising:
   a horizontally disposed support defining a feed fill opening therein;
   a cover member selectively closing said feed fill opening;
   a collapsible, generally tubular-shaped, non-metallic mesh wall, having upper and lower ends;
   said upper end of said mesh wall being secured to said support and extending downwardly therefrom;
   a lower base secured to said mesh wall which extends across the lower end thereof;
   said mesh wall being comprised of a plurality of alternating, generally horizontally disposed, first and second rows joined together;
   each of said first rows comprising a plurality of horizontally spaced-apart wall members having an opening positioned therebetween;
   each of said second rows comprising a plurality of horizontally spaced-apart wall members having an opening positioned therebetween;
   said first and second rows being horizontally staggered with respect to one another so that the said openings in said first rows are positioned above or below the said wall members in said second rows and so that the said openings in said second rows are positioned above or below the said wall members in said first rows;
   said mesh wall comprising a material containing rubber.

3. A collapsible feeder for birds, comprising:
   a horizontally disposed support defining a feed fill opening therein;
   a cover member selectively closing said feed fill opening;
   a collapsible, generally tubular-shaped, non-metallic mesh wall, having upper and lower ends;
   said upper end of said mesh wall being secured to said support and extending downwardly therefrom;
   a lower base secured to said mesh wall which extends across the lower end thereof;
   said mesh wall being comprised of a plurality of alternating, generally horizontally disposed, first and second rows joined together;
   each of said first rows comprising a plurality of horizontally spaced-apart wall members having an opening positioned therebetween;
   each of said second rows comprising a plurality of horizontally spaced-apart wall members having an opening positioned therebetween;
   said first and second rows being horizontally staggered with respect to one another so that the said openings in said first rows are positioned above or below the said wall members in said second rows and so that the said openings in said second rows are positioned above or below the said wall members in said first rows;
   each of said wall members having first and second, spaced-apart upper corners;
   each of said wall members having third and fourth, spaced-apart lower corners;
   said first upper corner of the said wall members in said first rows being joined to the said fourth lower corner of one of the wall members in said second row;
   said second upper corner of said wall members in said first rows being joined to the said third lower corner of said wall members in said second rows.

* * * * *